INVENTOR
CHARLES W. OTTO

BY John M. Stoudt

ATTORNEY

United States Patent Office 3,515,918
Patented June 2, 1970

3,515,918
PLURAL ROTOR OIL SLINGER
Charles W. Otto, De Kalb, Ill., assignor to General
Electric Company, a corporation of New York
Filed June 9, 1969, Ser. No. 831,591
Int. Cl. H02k 5/16
U.S. Cl. 310—90    8 Claims

ABSTRACT OF THE DISCLOSURE

The flange of the outer concentric rotor of a dual rotor electric motor carries in the vicinity of its hub a floating sleeve bearing on the rotor shaft, an outwardly inclined guide surface which overlaps the sleeve bearing at one end and is radially spaced from a shaft to receive centrifugally flung lubricating oil which is then pumped axially to the opposite end of the sleeve bearing.

BACKGROUND OF THE INVENTION

Field of the invention

This invention relates to oil return devices and more particularly to an oil return pumping device for each sleeve bearing which rotatably supports the outer or auxiliary rotor of an electric motor having two concentric rotors.

Description of the prior art

It is somewhat conventional to employ in electric motors or like dynamoelectric devices of the multiple concentric rotor type, sealed ball bearings for supporting the auxiliary rotor. The auxiliary rotor is cylindrical in form supported at each end by means of modified disk-like flanges whose central hub portion carries sealed ball bearings for supporting the same for relative motion on the rotor shaft. In such a dynamoelectric device, not only does the rotor shaft rotate relative to the stator housing with the inner rotor fixed thereto, but the auxiliary rotor, which is concentrically positioned between the inner rotor and the stator, rotates relative to the stator and at a different speed from that of the inner rotor. Thus, there is relative rotation between both rotor elements even though they are supported on a common central shaft. While the sealed ball bearings provide satisfactory support for the rotatable auxiliary rotor, sealed ball bearings are relatively costly, especially for fractional horsepower motors.

Attempts have been made to substitute sleeve bearings for the sealed ball bearings to support the auxiliary rotor since, sleeve bearings in general cost about one tenth that of anti-friction bearings. However, the conservation or retention of the lubricating oil for sleeve bearings constitutes an obstacle since, due to the porosity of the sleeve bearings, oil tends to seep from the ends thereof, especially when the motor is vertically oriented.

While the retention of lubricating oil within the sleeve bearings is present in conventional single rotor motors when in vertical orientation, the problems are considerably amplified when the vertically oriented motors are of the dual concentric rotor type. Further, the oil retention problem is particularly acute at the upper bearing of the dual concentric rotor type motor since, the oil must be lifted through the rotating hub of the outer rotor, up and into the oil well cup. Once the oil is in the oil well cup of the stator assembly, the oil is then readily absorbed by the felt packing system and by capillary action, is returned to the upper end of the sleeve bearing.

SUMMARY OF THE INVENTION

This invention is directed to a particular oil return pumping device in combination with a dynamoelectric machine in the form of an electric motor having dual concentric rotors. The cylindrical, auxiliary rotor is supported by a pair of modified, disk-like end flanges whose hubs are bored to receive the porous sleeve bearings which are in turn concentrically mounted on the rotor shaft. An annular oil deflector is fixedly carried by the shaft axially displaced from the porous sleeve bearing to block oil seeping downwardly along the shaft, and to throw the oil radially outwardly and into contact with an annular, outwardly inclined oil contact surface carried by the rotating hub. The hub is drilled to form inclined surface extensions which extend toward the outer end of the sleeve bearing. The oil climbs up hill along the inclined surfaces and upon reaching the outer edge of the inclined surface is flung outwards into the stationary oil well cover. Porous wick material or other capillary means carries the oil received by the stationary oil well cover to the outer end of the sleeve bearing.

In one form the slanted oil contact surface comprises paired, sloped, cone shaped cups carried on opposite sides of the auxiliary rotor flange, radially outward of the porous sleeve bearing with the flange being drilled at circumferentially spaced locations to allow oil seepage from the inner sloped annular ring to the outer ring. In a second embodiment, the hub itself has its inner periphery partially relieved on the inside face of the flange to provide the initial outwardly inclined surface which receives the oil leaving the annular oil deflector under centrifugal force. A plurality of circumferentially spaced, outwardly inclined, small diameter holes extend from the inclined surface to the outer face of the hub for carrying the accumulated lubricating oil to the vicinity of the outer end of the porous bearing where it discharges, under centrifugal force, into the stationary oil well cover.

DESCRIPTION OF THE PREFERRED EMBODIMENTS

Figure 1:
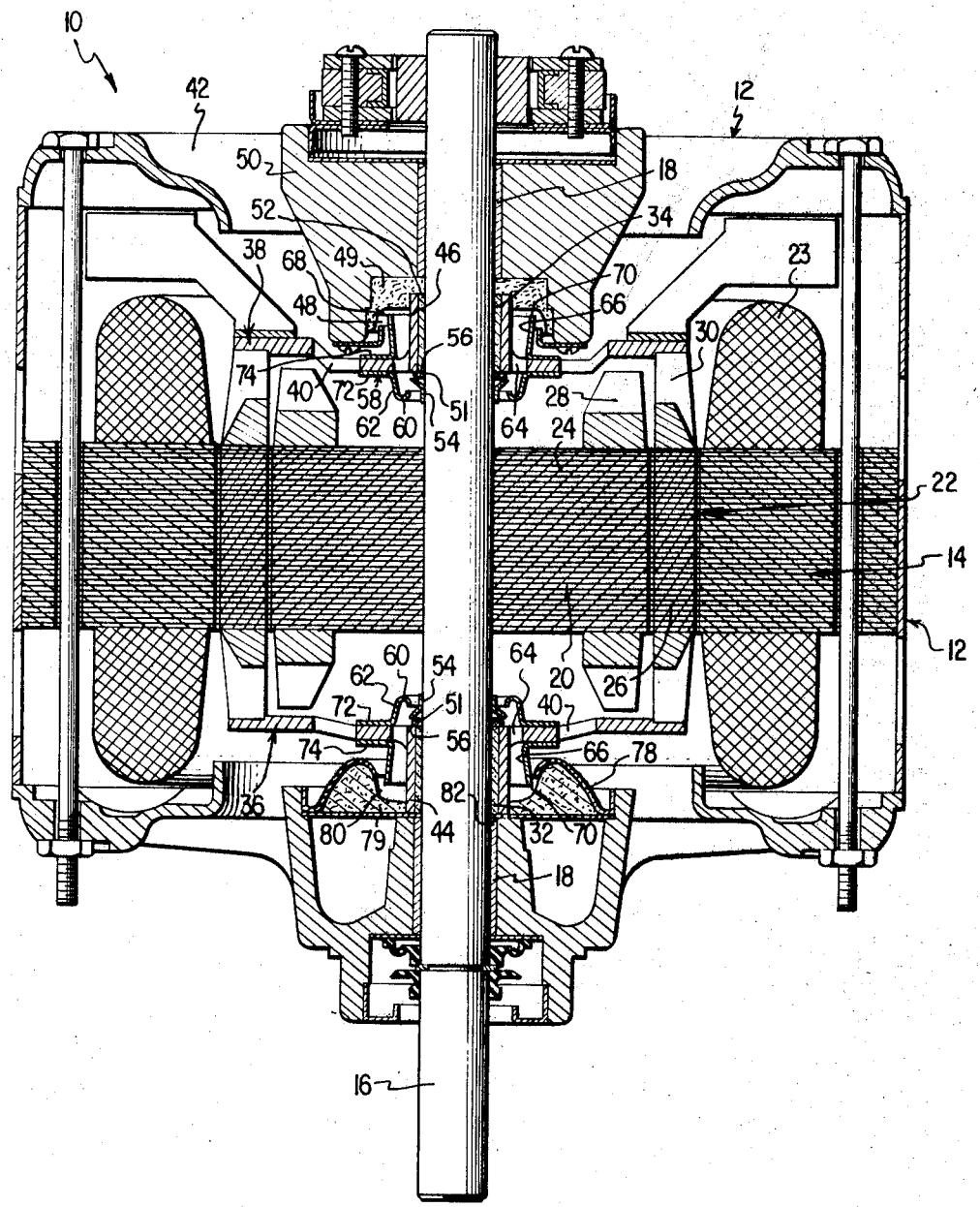
FIG. 1 is a sectional view of a dual rotor electric motor incorporating one form of the oil return pumping device of the present invention.
Figure 5:
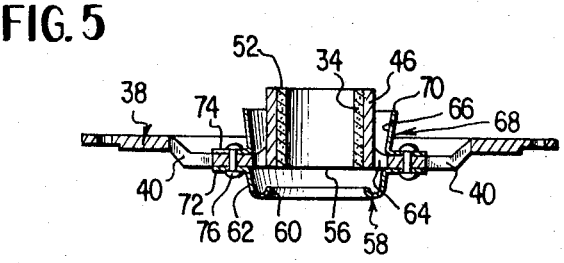
FIG. 5 is a sectional view of a modified end flange for supporting the auxiliary rotor as employed with the motor shown in FIG. 1.

Referring to FIGS. 1 and 5 of the drawing, there is shown a dynamoelectric device 10 comprising an electric motor of the dual rotor type consisting primarily of a stationary motor housing or casing 12, a stator 14, a rotor shaft 16 carried by the housing 12 by means of sleeve bearings 18, an inner rotor 20 fixed to the rotor shaft 16 and an intermediate, concentrically positioned, auxiliary rotor 22. The motor as here specifically disclosed, constitutes a fractional horsepower induction motor with the stator 14 formed of multiple laminations and carrying stator windings 23. Likewise, both the main rotor 20 and the auxiliary rotor 22 constitute cylindrical cores 24 and 26 respectively comprising a stack of laminations through which conductors 28 and 30 extend therethrough in conventional fashion.

The present invention is not directed to the structural arrangement of these components but rather to the conservation, retention and recirculation of lubricant for the sleeve bearings 32 and 34 which support the auxiliary rotor 22 on the rotor shaft 16. In this respect, in conventional fashion, the cylindrical auxiliary rotor 22 has fixedly coupled thereto, at both ends, flanges 36 and 38 respectively, which are in the form of modified disks bent and apertured at 40. The auxiliary rotor flanges 36 and 38 are formed with central hubs 44 and 46 which in themselves, carry porous sleeve bearings 32 and 34, each having an internal diameter on the order of the diameter of rotor shaft 16 and force fixed thereon. Hubs 44 and 46, therefore, rotate on the outer surfaces of respective porous metal sleeve bearings 32 and 34. With the motor 10 being vertically oriented, the upper hub 46 and sleeve bearing 34 are received within recess 48 of the stationary oil well cover 50 which forms a portion of end frame 42. Thrust collars 51 prevent axial shifting of shaft 16 and the components carried thereby. The cavity formed by recess 48 is supplied with wick material 49 having one end which is in contact with the outer edge 52 of the porous bearing 34.

The present invention is directed to an oil return pumping device which is incorporated specifically within each end flange of the auxiliary rotor carrying the porous sleeve bearings 32 and 34. In the embodiment shown in FIG. 1, the oil pumping device is generally similar for both lower end flange 36 and upper end flange 38. Referring to end flange 38, it is noted that the rotor shaft 16 carries an annular, generally L-shaped oil thrower 54 which is in peripheral contact with the rotating shaft and axially spaced slightly from the inner end 56 of porous bearing 46. Thus, any oil seeping through the porous bearing 34 and inwardly along the surface of shaft 16 accumulates against thrower 54 where it is thrown radially outwards, into contact with the inner oil shield or cup 58. The cup 58 is annular in configuration, has a curved edge 60 and an outwardly inclined contact surface portion 62. This provides an overall cone shape to cup 58. When the rotor revolves, oil which is thrown radially outwards by centrifugal force, after encountering the oil thrower 54, impinges upon the inclined surface 62 of the cone-shaped cup. When a desired r.p.m. is reached, and if the path is at a suitable radius and angle from plumb, this oil climbs up hill along the inclined surface 62 until it reaches flange 38. Flange 38 is provided with a plurality of circumferentially spaced holes or apertures 64 which allows the oil to continue to pass therethrough and onto inclined surface 66 of the outer cone-shaped cup 68. Inclined surface 66 of cup 68 constitutes an extension of the inclined surface 62 and thus the oil continues to climb up hill until it reaches the peripheral edge 70 of the outer cone-shaped cup 68. When the lubricating oil reaches the top of the inclined surface 66, it is flung outwards from the rotor, again by centrifugal force, towards the stationary oil well cover 50. Since the recess 48 in the oil well cover is filled, or at least partially filled, with wicking 49 or other capillary material, the accumulated oil received by the wick moves under capillary action to the upper or outer edge 52 of the upper bearing 34, and enters the porous bearing for recirculation.

The two oil cups or shields 58 and 68 terminate in flange portions 72 and 74 which are coupled to opposite sides of the auxiliary rotor support flange 38 by a plurality of rivets 76 in conventional fashion. The identical arrangement is employed at the lower end of the motor with respect to auxiliary rotor flange 36, like components being given like numerical designations. A slightly different configuration for the stationary oil well cover is shown. However, the serpentine cover component 78 may carry, in like fashion to recess 48, a wick material 79 within the associated cavity 80, such that the cavity in receiving the oil leaving the peripheral edge 70 of the tapered cup 68 directs the same to the outer end 82 of the porous bearing 32.

While the motor and the pumping action have been described in conjunction with a motor shaft which is vertically oriented, the pumping devices also facilitate the return of oil if the motor shaft is horizontal. Further, the motor itself may be either a fixed speed or variable speed device and the pumping arrangement has equal applicability to dynamoelectric machinery in the form of generators.

In the embodiment of FIG. 1, a pair of oppositely disposed tapered or cone-shaped cups 58 and 68 define the inclined surfaces which carry oil axially along the outside of the porous sleeve to facilitate return or recirculation of the lubricating oil to the outer edge or end of the porous bearings. The identical result may be achieved by the substitution of a rotor assembly having a slightly different type of auxiliary rotor flange in which, modification of the integrally formed, flange hub provides the major component of the oil return pumping device.

Figure 2:
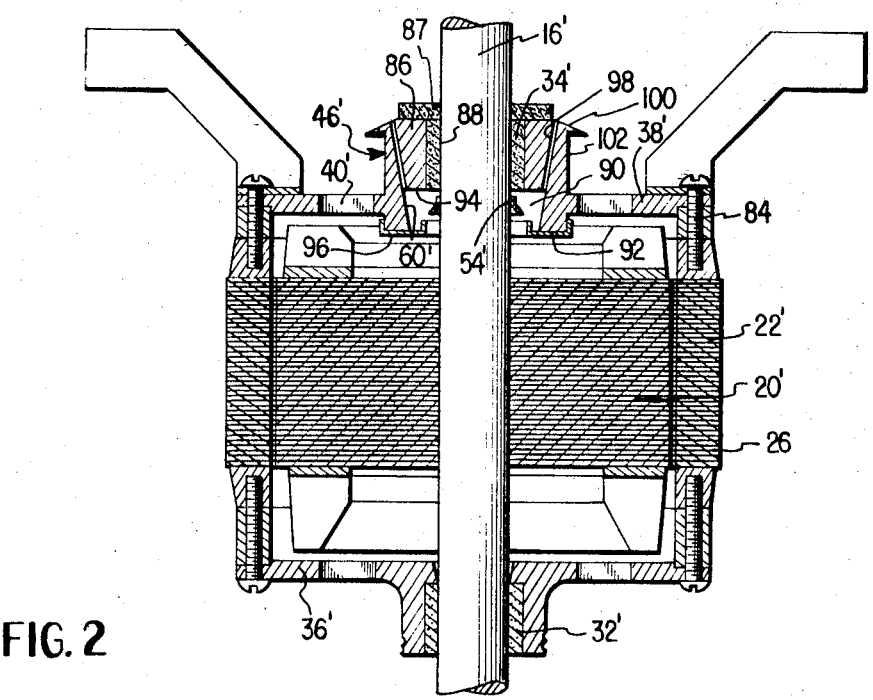
FIG. 2 is a sectional view of a motor, dual rotor arrangement incorporating a modified form of the oil return pumping device of the present invention.
Figure 3:
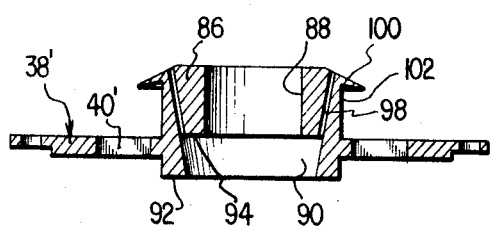
FIG. 3 is a sectional view of one of the end flanges which supports the auxiliary rotor and forms a primary portion of the oil return pumping device of the FIG. 2 embodiment.
Figure 4:
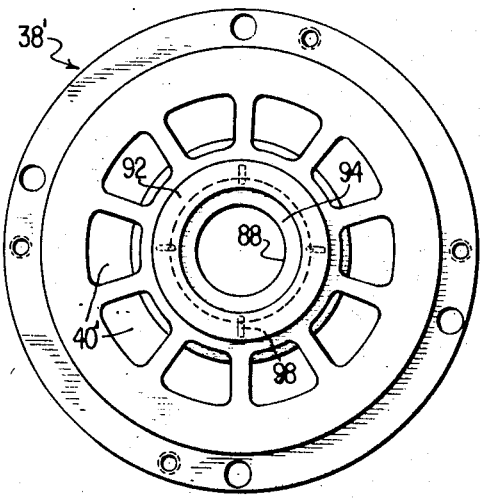
FIG. 4 is a plan view of the auxiliary rotor and flange shown in FIG. 3.

Turning to FIGS. 2, 3 and 4, the rotor assembly includes main rotor 20', which is fixedly coupled to rotor shaft 16' in identical fashion to that of the embodiment of FIG. 1. Likewise, the auxiliary rotor 22' comprises a cylindrical section formed of stacked laminations 26', the ends of which are coupled by means of screws 84 to auxiliary rotor end flanges 36' and 38' respectively. Porous sleeve bearings 32' and 34' are force fit on the shaft such that the flange hubs rotate on the bearing outer peripheries. In this case, the provision for recirculation of lubricating oil for the lower bearing 32' is eliminated. However, the hub 46' has been specifically modified to facilitate this function. In this respect, rather than being bent and apertured, the flange 38' is merely apertured at 40' to provide for coolant circulation and the flange terminates centrally at hub 46' including a major inner portion 86 which carries a bore 88 of a diameter generally on the order of the outer diameter of the porous sleeve bearing 34'. The porous sleeve bearing 34' is sandwiched between hub portion 86 and the rotary shaft 16' and fixed to said shaft. At its outer end there is fixed to shaft 16' a porous metal thrust bearing 87, limiting end play. In similar fashion to the previous embodiment, an annular oil thrower 54' of L-shaped configuration is carried by the shaft, internally of the porous bearing 34' with its inclined outer edges tending to cause accumulation of oil seeping along the shaft, which during rotation of the shaft, is radially thrown into contact with an inclined surface 60'. The inclined surface 60' is formed by providing an internal, sloped, annular recess 90 within the hub 46', which extends axially a portion of the hub length from the inner face or edge 92 to such an extent, that wall 94 of the recess lies flush with the inner edge of the porous bearing 34'. Further, an annular ring or cup 96 of U-shaped cross-section is carried by the hub 46' and acts in conjunction with the inclined surface 60' during rotation of the auxiliary rotor 22 to retain any oil which is flung onto the inclined surface 60 by momentary, capture of the same within the area defined by the ring 96, surface 60' and wall 94 of the hub recess.

Unlike the previous embodiments, a plurality of inclined, circumferentially spaced, small diameter holes 98 extend in line with the plane of the inclined surface 60', completely through the hub 46' to the beveled outer edge 100. Further, the beveled edge 100 extends radially beyond the major outer peripheral surface 102 of the hub so as to ensure the discharge, under centrifugal force, of the oil which is pumped up the inclined surface 60' and emerges from the small diameter holes 98. Upon reaching the end of the beveled or slanted edge 100, it is flung outward from the rotor into the stationary oil well cover (not shown). The oil pumping and return action is therefore identical to the embodiment of FIG. 1, however, in this case, with the exception of the oil thrower 54', the elements comprise machined portions of the hub 46' of the auxiliary rotor end flange 38'.

While in both embodiments, an annular oil thrower in the form of an L-shaped ring is carried internally of the auxiliary rotor porous sleeve bearing, for ensuring that all of the oil moving along the shaft as it escapes from the inner end of the porous sleeve bearing is thrown radially under centrifugal force into contact with the inclined, conical surface of the pumping device, it is readily apparent that in the absence of an oil thrower, centrifugal force alone will cause the oil escaping from the porous bearing to be discharged from the rotor shaft. However, the presence of the annular ring acts as a dam to prevent movement of the oil beyond the proximity of the conical pumping surface carried by the auxiliary rotor end flange. Were it not for the deflector or thrower, some of the oil would eventually be thrown against the main rotor bars 28, for instance, and would not be recirculated in the desired manner.

What is claimed is:

1. In combination a dynamoelectric machine comprising: a stator, a shaft rotatably supported within said stator, a first rotor fixed to said shaft and rotatable therewith, a second cylindrical rotor concentrically positioned between said first rotor and said stator and including on at least one end, a flange extending from said cylindrical rotor toward said shaft and adjacent the side of said first rotor, a sleeve bearing carried by said end flange for supporting said second rotor on said shaft for free rotation therewith, a cone-shaped surface carried by said end flange, axially overlying the inner end of said sleeve bearing and inclined radially outwards towards the outer end of said bearing, and stationary means operatively associated with said cone-shaped surface for delivering oil pumped axially along said inclined surface to the outer end of said sleeve bearing.

2. The dynamoelectric machine as claimed in claim 1 wherein said stationary means comprises a porous wick carried by said stator, spaced radially outwards of the outer edge of said cone-shaped surface with said wick having a portion in contact with the outer end of said sleeve bearing.

3. The dynamoelectric machine as claimed in claim 1 further comprising an oil thrower carried by said shaft and axially spaced from the inner end of said sleeve bearing and wherein the inner edge of said cone-shaped surface terminates in a reversely turned, annular, cup-shaped portion which rotates interiorly of said oil thrower.

4. The dynamoelectric machine as claimed in claim 1 wherein said cone-shaped surface comprises inner and outer cone-shaped members coupled to opposite sides of said end flange and said flange carries a plurality of holes at circumferentially spaced locations, said holes being generally in line with the oil contact surface of each of said cone-shaped members.

5. The dynamoelectric machine as claimed in claim 4 wherein said inner cone-shaped member terminates in a reversely bent edge which is axially positioned beyond said annular oil thrower.

6. The dynamoelectric machine as claimed in claim 4 wherein said flange includes a central hub having a central opening which receives said sleeve bearing, said hub thickness being in excess of the axial length of said sleeve bearing, the inner face of said hub carries an annular recess including a cone-shaped surface and said hub further includes a plurality of radially inclined, circumferentially spaced holes which extend from said cone-shaped peripheral recess surface to the outer face of said hub, whereby; during rotation of said second, cylindrical rotor, oil is pumped through said inclined holes toward the outer end of said bearing.

7. The dynamoelectric machine as claimed in claim 6 wherein the outer face of said hub is beveled to facilitate centrifugal discharge of lubricating oil emerging from said circumferentially spaced series of holes.

8. The dynamoelectric machine as claimed in claim 7 further comprising; an annular cup member of U-shaped cross-section carried on the inner face of said hub and having an inner peripheral edge which extends into said hub annular recess for preventing lubricating oil from being discharged inwardly toward said first rotor, and an oil thrower carried on the periphery of said shaft, spaced inwardly of said sleeve bearing, but outwardly of said annular cup member.

References Cited

UNITED STATES PATENTS

| 1,037,217 | 9/1912 | Diehl | 308—134.1 |
| 1,992,818 | 2/1935 | Else | 308—187 |
| 2,243,961 | 6/1941 | Howarth | 308—73 |
| 2,264,847 | 12/1941 | Johnson | 230—206 |
| 2,864,017 | 12/1958 | Waltscheff | 310—126 |
| 3,153,382 | 10/1964 | Van Blarcom | 310—90 X |
| 3,365,596 | 1/1968 | Jones | 310—90 X |
| 3,393,025 | 7/1968 | Jenkins | 308—132 |
| 3,423,138 | 1/1969 | Hardy | 308—132 |

DONOVAN F. DUGGAN, Primary Examiner

U.S. Cl. X.R.

308—132; 310—125, 126